United States Patent
Thimmappa et al.

(10) Patent No.: US 9,380,194 B2
(45) Date of Patent: Jun. 28, 2016

(54) SYSTEMS AND METHODS FOR SUPPORTING A VIDEO CALL IN A DARK OR LOW LIGHT ENVIRONMENT

(71) Applicant: Cellco Partnership, Arlington, VA (US)

(72) Inventors: Sheela Thimmappa, Bridgewater, NJ (US); Ning Zhang, Warren, NJ (US); Charles Lane, Somerset, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 14/299,755

(22) Filed: Jun. 9, 2014

(65) Prior Publication Data

US 2015/0358520 A1    Dec. 10, 2015

(51) Int. Cl.
| | |
|---|---|
| H04N 5/222 | (2006.01) |
| H04N 5/225 | (2006.01) |
| H04N 5/235 | (2006.01) |
| H04N 7/14 | (2006.01) |
| G09G 3/34 | (2006.01) |

(52) U.S. Cl.
CPC ........... *H04N 5/2256* (2013.01); *G09G 3/3426* (2013.01); *H04N 5/2354* (2013.01); *H04N 7/142* (2013.01); *G09G 2320/0626* (2013.01); *G09G 2354/00* (2013.01); *H04N 2007/145* (2013.01)

(58) Field of Classification Search
CPC .................................................. H04N 5/2256
USPC ........ 348/14.01, 14.02, 700; 362/13; 396/155
See application file for complete search history.

(56) References Cited

U.S. PATENT DOCUMENTS

| | | | | |
|---|---|---|---|---|
| 2008/0075243 | A1* | 3/2008 | Kent et al. | 379/88.12 |
| 2010/0099464 | A1* | 4/2010 | Kim | 455/566 |
| 2010/0189429 | A1* | 7/2010 | Butterworth | 396/155 |
| 2011/0179366 | A1* | 7/2011 | Chae | 715/764 |
| 2012/0080944 | A1* | 4/2012 | Recker | H02J 9/02 307/25 |
| 2013/0083214 | A1* | 4/2013 | Nakata | 348/222.1 |
| 2014/0293134 | A1* | 10/2014 | Hung | 348/624 |
| 2014/0362159 | A1* | 12/2014 | Zhai et al. | 348/14.01 |

FOREIGN PATENT DOCUMENTS

CN      103220421 B   *   1/2015

* cited by examiner

*Primary Examiner* — Usman Khan

(57) ABSTRACT

Systems and methods for providing illumination for a video call in a low-lighting environment. The light source may be a hardware component integrated on the front of a mobile device. The light source may be implemented as one or more lit spaces on the device's screen. The intensity of the light from the light source may be based on ambient light levels measured by one or more sensors on the device. When the mobile device receives an incoming video call, the sensors may detect the level of ambient light and activate the light source to illuminate the face of the call recipient if he or she answers the incoming video call. The device may include an interface to allow the user to configure and adjust the intensity, coloring, and lighting pattern of the light during the video call.

20 Claims, 13 Drawing Sheets

SYSTEMS AND METHODS FOR SUPPORTING A VIDEO CALL IN A DARK OR LOW LIGHT ENVIRONMENT

BACKGROUND INFORMATION

Many service providers now provide voice and video calling services over a network, including LTE networks. A voice over LTE (VoLTE) video call adds a video component to an existing VoLTE voice call. When a person places a video call using VoLTE service on a mobile device, the device uses its video camera to capture real time video. Video calls use either front or back facing camera for video capture and sharing. Currently, most of devices support a built-in flash (which can be kept on and used as a continuous lighting for taking video) for the back facing camera. However, the front facing camera does not support flash, which makes it very difficult or even impossible to capture video in dark or low light environments.

Another problem with the existing flash for the back facing camera is that it only has limited setting (on/off/auto) and does not offer power efficient controlling options. When the flash is kept continuously on for taking video, it beams very high intensity light and consumes a lot of power and therefore drains the mobile device's battery rapidly.

These and other drawbacks exist.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

Figure 1:
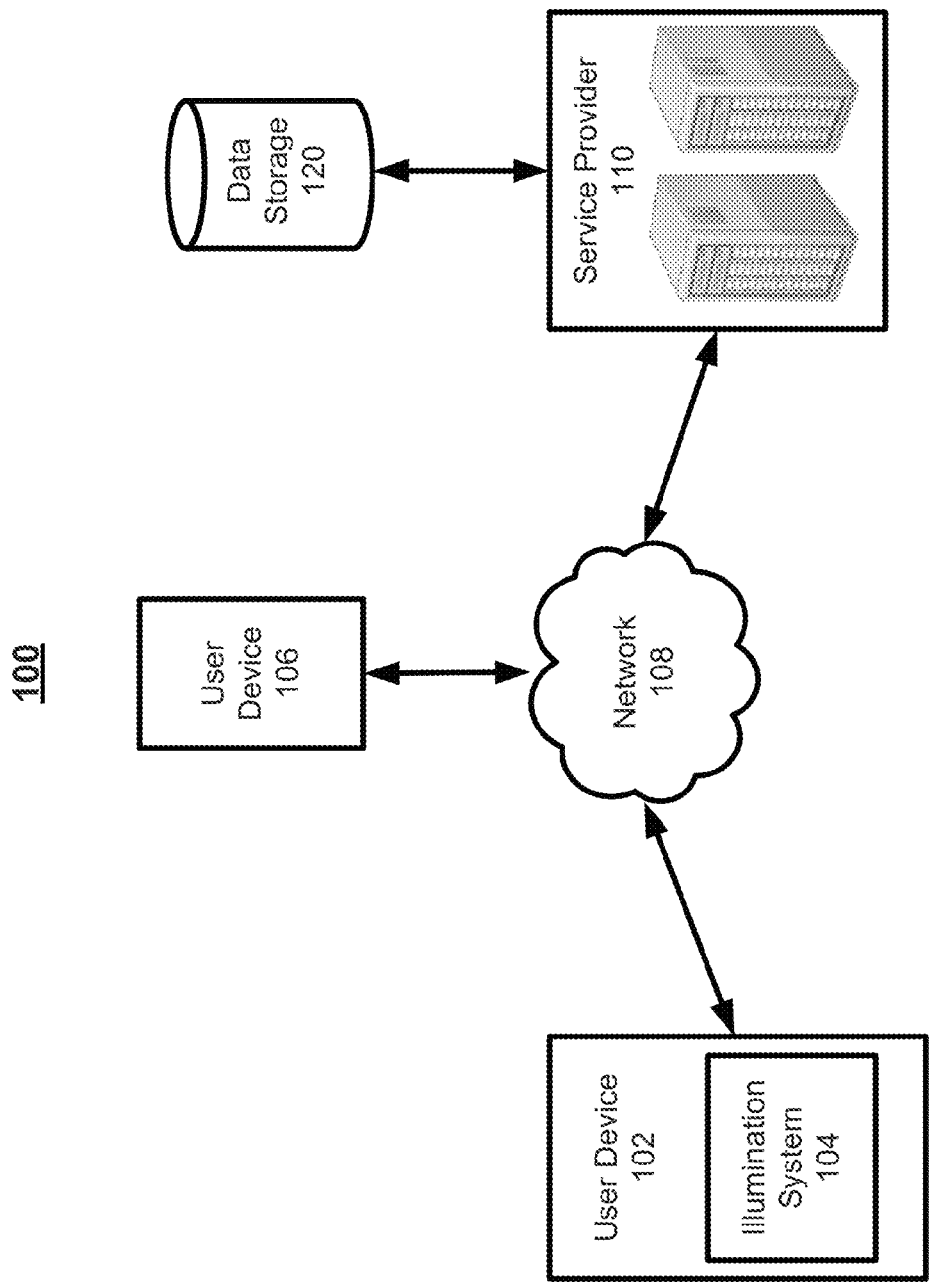
FIG. 1 is a schematic diagram illustrating a system according to a particular embodiment.

A system and method may include various embodiments for providing illumination for a video call in a low-lighting environment. The light source may be a hardware component integrated on the front of a mobile device. The light source may be one or more light emitting diodes (LEDs) that are installed proximate to a front facing camera on the mobile device. The mobile device may include one or more light sensors. When the mobile device receives an incoming video call, the sensors may detect the level of ambient light and activate the light source to illuminate the face of the call recipient if he or she answers the incoming video call.

The light source may have varying intensity depending on the level of detected ambient or atmospheric lighting. The light source may use white light, or some warm color that is emitted at a certain intensity. The user of the mobile device may be able to manually adjust the intensity of the light. The light source may be located on the lower part of the device near a physical "home key" or overlay with the home key for user comfort. The light source may be located above the screen of the device.

In various embodiments, lighting can also be implemented via software that generates lit spaces on the device's screen. The lit spaces may comprise white or warm color stripes, and can be generated on the outer edge of the screen as a lighting frame while the center of the screen is left open and reserved for showing the video calling user interface.

The user device may generate a video calling interface that appears on the screen during the video call. The interface may include one or more interactive features that allow the user to configure and adjust the level of light, intensity, coloring, and lighting pattern (for software-generated lighting elements). The interface may allow the user to designate certain contacts and associate those contacts with certain lighting configurations so that when the mobile device receives a video call from that contact, the interface generates a specific lighting configuration. For example, in various embodiments, video calls from contacts that are not associated with actual stored images may cause the user device to generate light at a higher intensity.

The description below describes video call modules, light detection modules, illumination modules, contact list modules, interface modules, user devices, service providers, computer systems, data storage, and networks that may include one or more modules, some of which are explicitly shown while others are not. As used herein, the term "module" may be understood to refer to computing software, firmware, hardware, and/or various combinations thereof. It is noted that the modules are examples. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

It is further noted that software described herein may be tangibly embodied in one or more physical media, such as, but not limited to, a compact disc ("CD"), a digital versatile disc ("DVD"), a floppy disk, a hard drive, read only memory ("ROM"), random access memory ("RAM"), flash memory, as well as other physical media capable of storing software, and/or combinations thereof. The functions described as being performed at various components may be performed at other components, and the various components may be combined and/or separated. Other modifications also may be made.

FIG. 1 is a schematic diagram illustrating a system according to a particular embodiment. A system 100 may include user device 102, user device 106, a network 108, and a service provider 110. Service provider 110 may include network accessible storage that may be local, remote, or a combination thereof to the components depicted in FIG. 1. Although elements of system 100 may be described as a single device, it will be appreciated that multiple instances of these devices may be included in system 100, such as, for example, multiple user devices, multiple service providers, multiple data storages, and multiple networks. A user may be associated with user device 102, and another user may be associated with user device 106. The user of user device 106 may attempt to make a video call to user device 102 via network 108.

User devices 102 and 106 may be, for example, but not limited to, a cellular telephone, Session Initiation Protocol ("SIP") phone, software client/phone, a desktop computer, a laptop/notebook, a server, a module, a satellite phone, a personal digital assistant ("PDA"), a tablet computer, a smart phone, a remote controller, a personal computer ("PC"), a workstation, a handheld PC, a handheld MP3 player, a handheld video player, a personal media player, a gaming device, a thin system, a fat system, a network appliance, and/or other mobile communication device that may be capable of transmitting and/or receiving data. Also, user devices 102 and 106 may include one or more transmitters, receivers, and/or transceivers to transmit and/or receive one or more signals to and/or from other components depicted in FIG. 1, including, for example, service provider 110.

Network 108 may be a wireless network, a wired network, or any combination of wireless network and wired network. For example, network 108 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, network 108 may include, without limitation, telephone line, fiber optics, IEEE Ethernet 802.3, a wide area network ("WAN"), a local area network ("LAN"), or a global network such as the Internet. In various embodiments, network 108 may support, an Internet network, a wireless communication network, a cellular network, or the like, or any combination thereof. In various embodiments, network 108 may be a 4G network that complies with the International Mobile Telecommunications Advanced (IMT-Advanced) specification. Network 108 may be a Long Term Evolution (LTE) network. Network 108 may be a LTE Advanced (LTE-A) network. Network 108 may be a Mobile WiMAX (IEEE 802.16e). Network 108 may be a Mobile WiMAX Release 2 (IEEE 802.16m) network. Network 108 may further include one, or any number of the exemplary types of networks mentioned above operating as a stand-alone network or in cooperation with each other. Network 108 may utilize one or more protocols of one or more network elements to which it is communicatively coupled. Networks 108 may translate to or from other protocols to one or more protocols of network devices. Although network 108 is depicted as one network, it should be appreciated that according to one or more embodiments, network 108 may comprise a plurality of interconnected networks, such as, for example, a service provider network, the Internet, a broadcaster's network, a cable television network, corporate networks, and home networks.

The components depicted in FIG. 1 may transmit and receive data to and from network 108 representing broadcast content, user request content, parallel search queries, parallel search responses, and other data. The data may be transmitted and received utilizing a standard telecommunications protocol or a standard networking protocol. For example, one embodiment may utilize Voice Over LTE ("VoLTE"). Other embodiments may utilize Session Initiation Protocol ("SIP"). In other embodiments, the data may be transmitted and/or received utilizing other Voice Over IP ("VOIP") or messaging protocols. For example, data may also be transmitted and/or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving broadcast or parallel search data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. Network 108 may use standard wireless protocols including IEEE 802.11a, 802.11b and 802.11g. Network 108 may also use protocols for a wired connection, such as an IEEE Ethernet 802.3.

User device 102 may include illumination system 104. Illumination system 104 may be a combination of software and hardware configured to facilitate a video call with another user device (e.g., user device 106) and provide illumination for the user of user device 102 in a low-lighting environment. Illumination system 104 may be a software application on user device 102.

Illumination system 104 may include one or more devices, modules, and/or components for providing routing information for transmitting data over a network, such as, for example, an IP network and/or a PSTN. Illumination system 104 may include a video call module, a light detection module, an illumination module, a contact list module, and an interface module as described herein in reference to FIG. 2. Illumination system 104 may be integrated into user device 102. Service provider 110 may interact with network 108 to provide video calling services for user devices 102 and 106.

Figure 2:
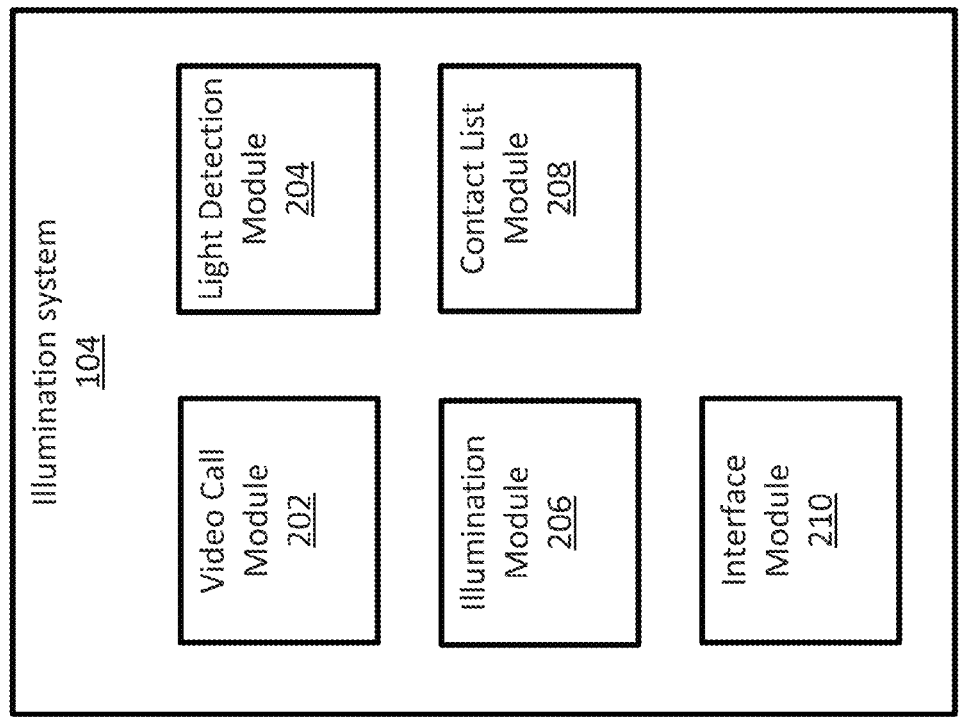
FIG. 2 is a schematic diagram of a hardware component of the system of a particular embodiment.

FIG. 2 is a block diagram of a hardware and software component of an exemplary embodiment of illumination system 104. For example, illumination system 104 may include a video call module 202, light detection module 204, illumination module 206, contact list module 208, and an interface module 210. It is noted that modules 202, 204, 206, 208, and 210 are exemplary and the functions performed by one or more of the modules may be combined with that performed by other modules. The functions described herein as being performed by modules 202, 204, 206, 208, and 210 may also be separated and may be performed by other modules at devices local or remote to illumination system 104. The modules may each be a software program or an appropriately programmed computer, such as a mainframe or personal computer, or may include a plurality of such computers cooperating to perform the functionality described herein. Modules 202, 204, 206, 208, and 210 may also be coupled to or integrated with illumination system 104. For example, modules 202, 204, 206, 208 and 210 may be external devices that are wirelessly coupled and/or communicatively coupled to illumination system 104 via an interface port which may include, without limitation, USB ports, system bus ports, or Firewire ports and other interface ports. Further, computer code may be installed on illumination system 104 to control and/or operate a function of video call module 202, light detection 204, illumination module 206, contact list module 208, and/or interface module 210.

Video call module 202 may detect in incoming video call from another device, such as user device 106. The call may be received over network 108. The call may be a VoLTE video call. The call may include the phone number associated with user device 106 (the calling party). The call may include other data that identifies the calling party. Video call module 202 may interface with receivers and transceivers of user device 102 to detect when user device 102 receives an incoming video call. Video call module 202 may signal modules 204, 206, 208, and 210 upon detecting an incoming video call. In various embodiments, video call module 202 may signal modules 204, 206, 208, and 210 upon detecting an outgoing video call (e.g., the user of user device 102 has initiated an outgoing video call to user device 106 by dialing a number associated with user device 106).

Light detection module 204 may interface with one or more sensors on user device 102 to detect the ambient light level of the environment around user device 102 when video call module 202 detects an incoming video call or an outgoing video call. The one or more sensors may be photosensors. The one or more sensors may be analog and/or digital ambient light sensors (ALS). The sensors may detect ambient light. The sensors may include one or more microprocessors to measure the ambient light level based on the detected ambient light and provide the measurement to light detection module 204. In various embodiments, light detection module 204 may determine the ambient light level based on the detected ambient light from the one or more sensors. The sensors may measure the luminosity of the ambient light. Light detection module 204 may be configured to compare the measured ambient light level to a threshold level. The threshold level may be based on a previously determined level of ambient light that is desirable to sufficiently illuminate the face of the user of user device 102. If light detection module 204 determines that the measured ambient light level is less than the threshold level, light detection module 204 may signal illumination module 206 to activate one or more light sources. In various embodiments, the ambient light level (illuminance) may be measured in lux.

In various embodiments, the user may specify the threshold level by manually selecting a setting using interface module 210. The user may assign a unique threshold level to a given caller, such that when the user receives a video call from that caller, light detection module 204 will use the unique threshold level assigned to that caller and compare that level with the measured ambient light level.

In various embodiments, light detection module 204 may use the front-facing camera on user device 102 to attempt to recognize the face of the user of user device 102 (assuming the user is facing the camera and attempting to answer the incoming video call or initiate an outgoing video call). If light detection module 204 is able to recognize the face of the user (or recognize the presence of a face in the camera's field) using facial recognition, light detection module 204 may determine that no illumination is necessary. In various embodiments, light detection module 204 may constantly receive updated ambient light measurements from the one or more ambient light sensors and compare the measurements to the threshold level during the course of the video call. Light detection module 204 may measure the ambient light level for a preset amount of time before signaling illumination module 206. Light detection module 204 may measure the ambient light level for a preset amount of video frames or a preset amount of time before signaling illumination module 206. Light detection module 204 may be configured to only signal illumination module 206 if the measured ambient light is less than the threshold level for a minimum length of time and/or a minimum number of video frames. If during the video call, light detection module 204 determines that the ambient light has increased to the threshold level for a given length of time (for example, if the user of user device 102 enters a well-lit room during the call), light detection module 204 may signal illumination module 206 that illumination is no longer necessary, and illumination module 206 may decrease and/or turn off the light source.

Figure 3:
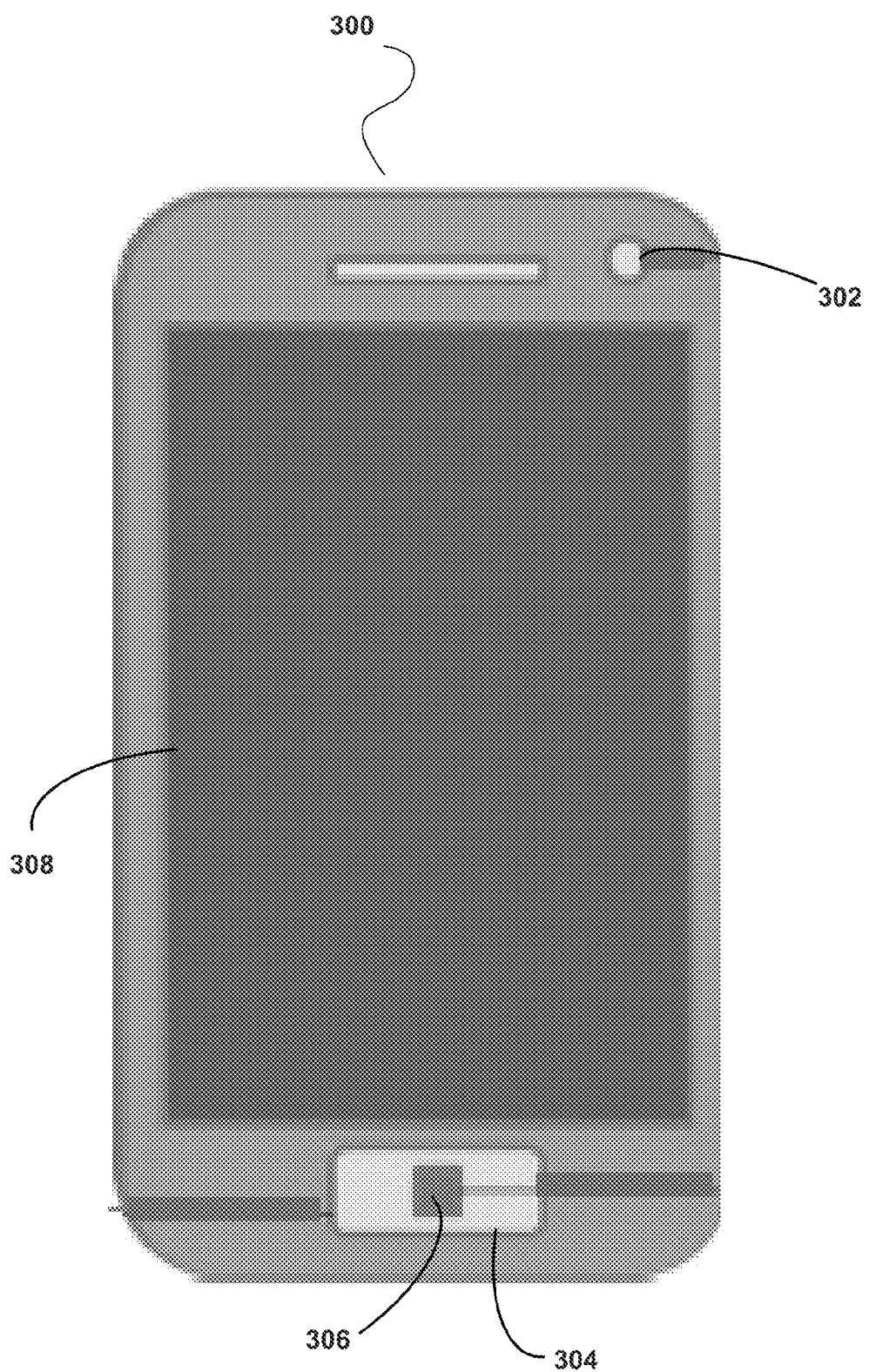
FIG. 3 is a mobile device equipped with an illumination source according to a particular embodiment.

Illumination module 206 may activate one or more light sources on user device 102 based on the readings received by light detection module 204. The light source may be physical hardware embedded in user device 102. The light source may be an LED. Embodiments of this are shown in FIGS. 3-6. In these embodiments, user devices 300-600 may be similar to user device 102 shown in FIG. 1. Each of user devices 300-600 may include illumination system 104. In the embodiment in FIG. 3, user device 300 may include a front-facing camera 302, a button 304, and a light source 306. The button 304 may be a "home" button for device 300. In FIG. 3, light source 306 is located in the center of home button 304, below screen 308. In FIG. 3, ambient light sensors may be physically integrated with camera 302. In various embodiments, one or more ambient light sensors may be physically integrated with light source 306, button 304, and/or screen 308. One or more ambient light sensors may be located on other parts of user device 300. When the user of device 300 attempts to answer or initiate a video call, the user may be facing screen 308 and front-facing camera 302. Front-facing camera 302 may capture the image of the user's face, which may be transmitted to the other party. The video of the other party's image may be shown on screen 308 during the call.

Light source 306 may emit white light. Light source 306 may emit a warm colored light, such as yellow, orange, or red. Illumination module 206 may vary the intensity and/or color of the light emitted by light source 306 based on the ambient light measurement received by light detection module 204. The intensity of the emitted light may be measured in lumens. For example, if the detected ambient light level is significantly lower than the threshold level, illumination module 206 may cause light source 306 to increase the intensity of the emitted light. The level of the increase in intensity of the emitted light may depend on the difference between the measured ambient light and the threshold level. If the detected ambient light level increases so that it is only moderately lower than the threshold level, illumination module 206 may reduce the intensity of the light from light source 306 accordingly. For example, in various embodiments, illumination module 206 may be configured to increase the intensity of the emitted light by 400 lumens for every 10 lux difference between the ambient light level and the threshold level (where the measured ambient light level is less than the threshold level). In this example, if the detected ambient light level is 30 lux, and the threshold value is 50 lux, illumination module 206 will cause the light source to emit light at 800 lumens.

In various embodiments, the intensity of the emitted light may be a function of the difference between the ambient light level and the threshold value (if the ambient light level is lower than the threshold value). The function may be a linear function, a non-linear function, a step function, or a combination of these. For example, illumination module 206 may be configured to increase the intensity of emitted light by 600 lumens for every 5 lux difference between the ambient light level and the threshold light level greater than 20 lux (where the measured ambient light level is less than the threshold level). The relationship may be set by the user and/or preprogrammed into illumination system 104.

The light sources shown in FIGS. 3-6 may be located on the user device in a position so that the light sources can illuminate the face of the user, without shining directly into the user's eyes. Interface module 210 may present one or more cursors that allow the user to determine the relationship between measured ambient light and the intensity of the light emitted from the light source on the user device. The user may vary this relationship based on the identity of the calling party.

In various embodiments, illumination module 206 may also vary the intensity of the emitted light based on the battery level of user device 102. For example, if the battery level of user device 102 drops below a certain threshold (e.g., 25%), illumination module 206 may decrease the intensity of the emitted light accordingly. In various embodiments, illumination module 206 may decrease the intensity of the emitted light by 100 lumens for every 10% drop in the battery level of user device 102. The relationship between the intensity of the emitted light and the battery level may be linear, non-linear, a step function, or some combination of these.

Interface module 210 may present a graphical user interface on the screen of the user device before, during, and/or after the video call. The graphical user interface may include a selectable cursor that allows the user to increase or decrease the intensity/brightness of emitted light. The cursor may be configured to allow the user to increase or decrease the intensity of the illuminated light at discrete intervals (e.g., $1/16^{th}$ of full intensity). This allows user to easily adjust the light intensity as desired to save battery life without wasting unnecessary power during video calling and also makes it manually controllable by user for convenience and comfort. Interface module 210 may present the user with options to set the color of the light emitted by the light source (or light sources).

Figure 4:
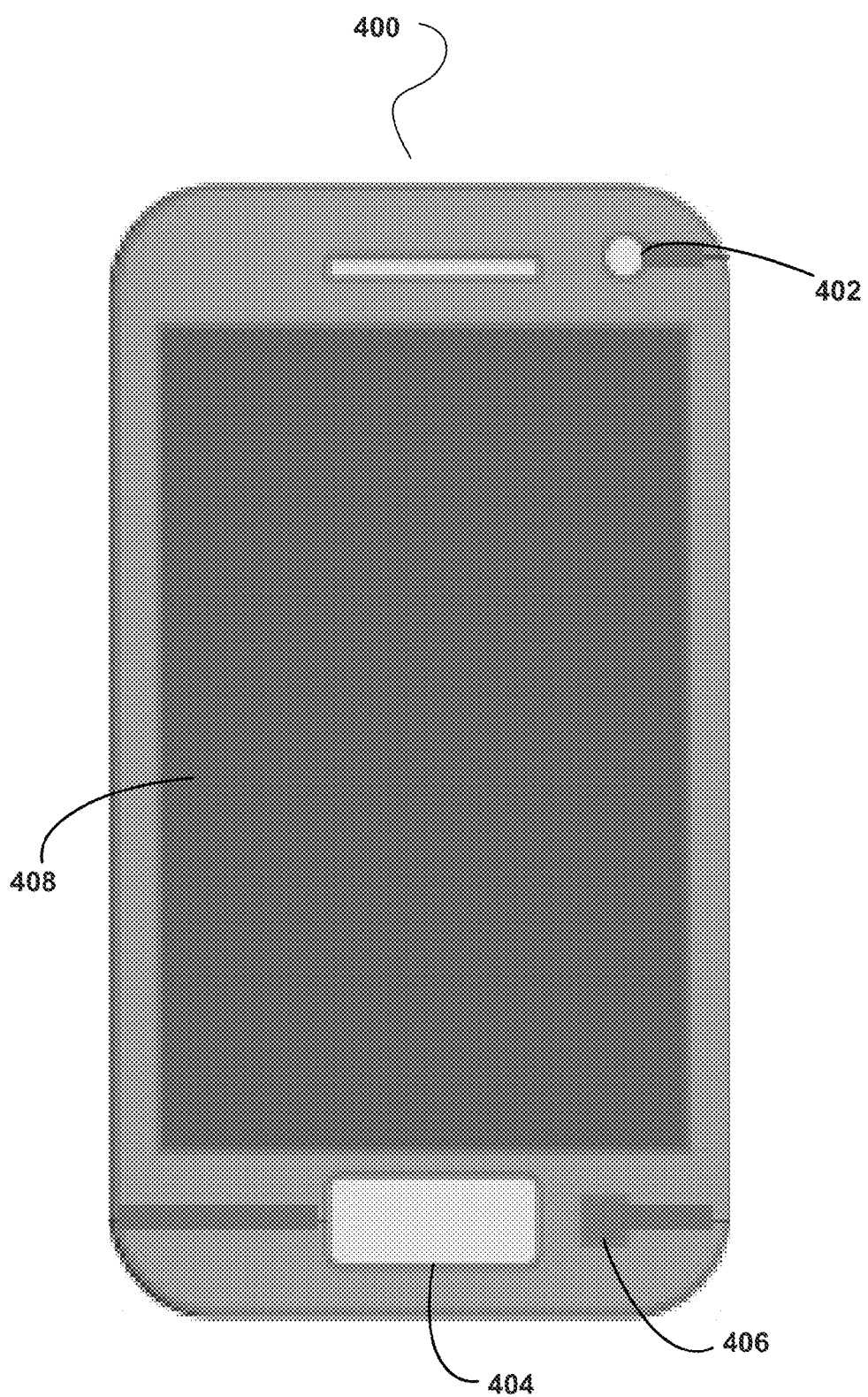
FIG. 4 is a mobile device equipped with an illumination source according to a particular embodiment.
Figure 5:
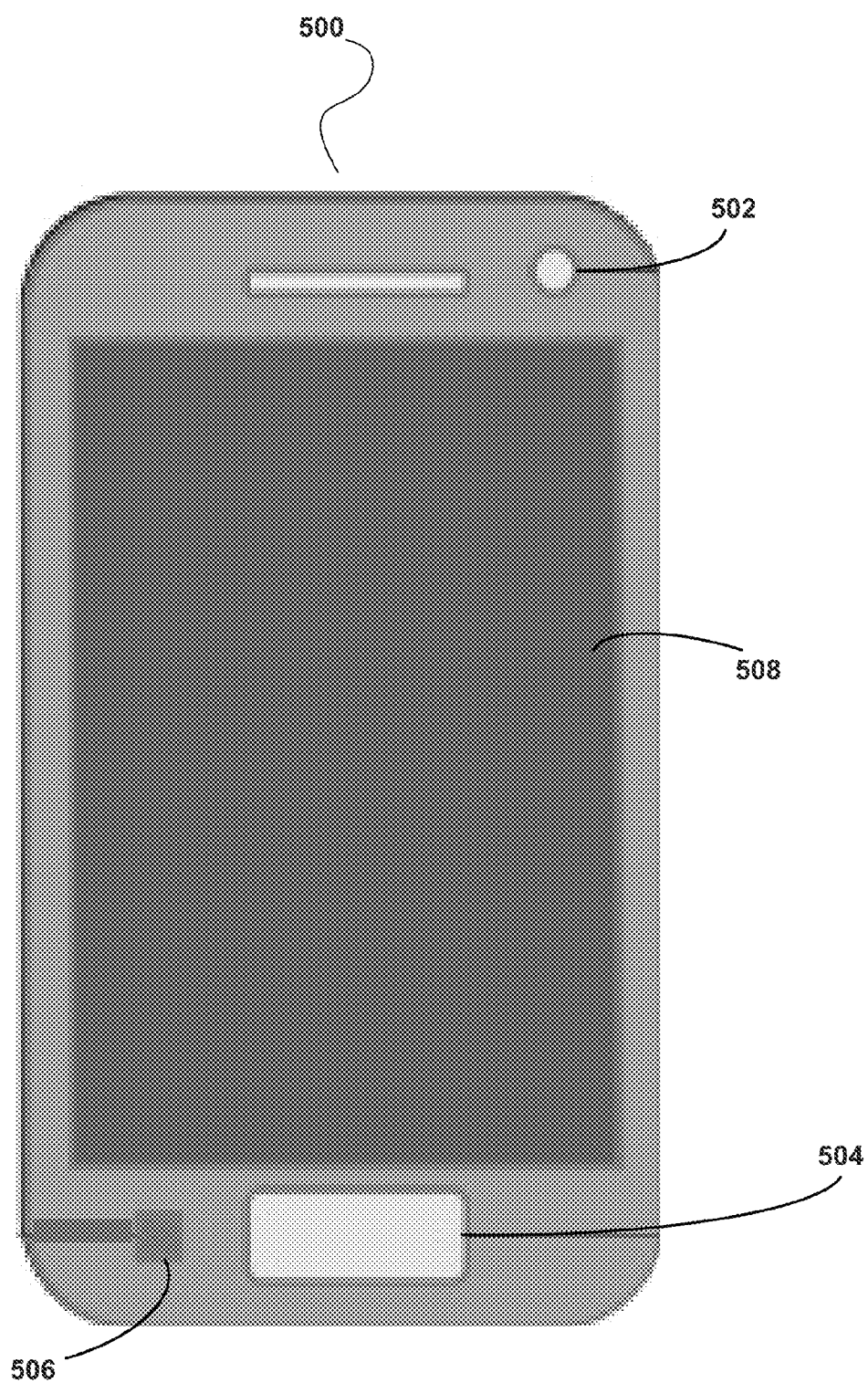
FIG. 5 is a mobile device equipped with an illumination source according to a particular embodiment.
Figure 6:
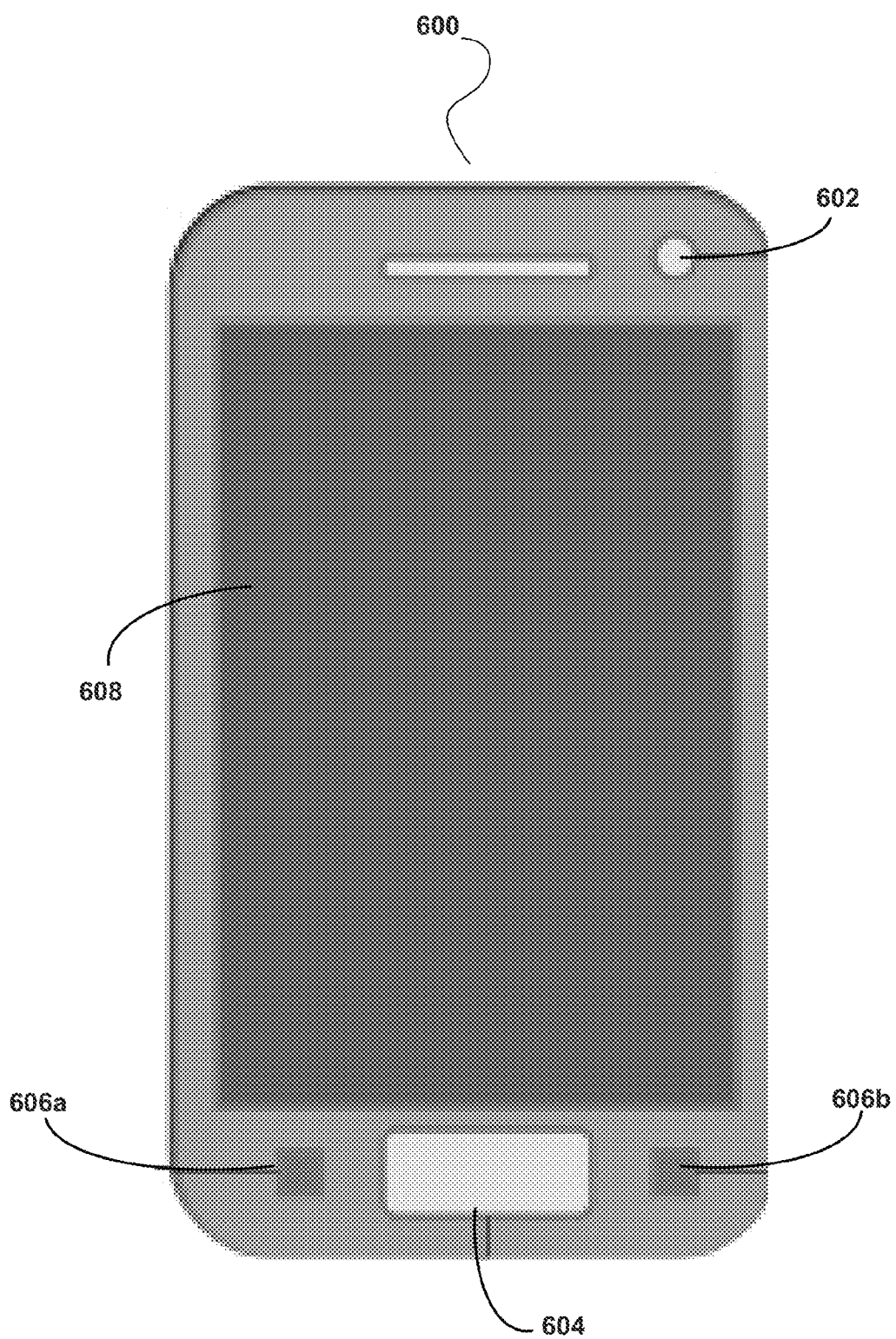
FIG. 6 is a mobile device equipped with an illumination source according to a particular embodiment.

FIG. 4 depicts an embodiment of the front of user device 400, having a front facing camera 402, a home button 404, a screen 408, and a light source 406. As shown in FIG. 4, the light source 406 is located at the bottom right side of user device 400. One or more ambient light sensors may be integrated with one or more of camera 402, home button 404, screen 408, and/or light source 406. FIG. 5 depicts a similar user device 500, only in this embodiment light source 506 is located at the bottom left side of user device 500. One or more ambient light sensors may be integrated with one or more of camera 502, home button 504, screen 508, and/or light source 506. In FIG. 6, user device 600 has two light sources, 606a and 606b. One or more ambient light sensors may be integrated with one or more of camera 602, home button 604, screen 608, and/or light sources 606a and 606b. The ambient light sensors may be located on other portions of user device 600. In embodiments with multiple light sources, such as user device 600, illumination module 206 may be configured to vary the intensity and/or color of the emitted light of each light source independently, based on ambient light conditions, the position of the user, and/or user input (e.g., from the interface generated by interface module 210). For example, in various embodiments, illumination module 206 may interact with camera 602 to detect the location of the face of the user of user device 600 relative to the screen 608. If, for example, the user's face is closer to the right side of the screen 608, illumination module 206 may detect this using camera 602 and increase the intensity of the light from light source 606b accordingly, while not increasing the intensity of the light from light source 606a the same amount. Similarly, if a light source is positioned near the top of user device 600 and another light source is positioned near the bottom of user device 600, illumination module 206 may increase the intensity of the light from the light source near the top of user device 106 if camera 602 detects the user's face closer to the top of screen 608.

In various embodiments, user devices 300-700 may have multiple ambient light sensors. Each of the one or more ambient light sensors may be positioned proximate to the one or more light sources. Referring to FIG. 6, if a light sensor integrated with light source 606b detects a lower level of ambient light than a light sensor integrated with light source 606a, illumination module 206 may increase the intensity of the light emitted from light source 606b by a greater amount than the light emitted by light source 606a. For each light source, illumination module 206 may determine the intensity of the emitted light of that light source as a function of the difference between the ambient light (detected by the ambient light sensor proximate to that light source) and the threshold value. As described above, this function may be linear, non-linear, and/or a step function. Interface module 210 may present a cursor for each light source that allows the user to configure the intensity and/or color of the light emitted by each of light sources 606a and 606b.

In various embodiments, illumination module 206 may provide one or more light sources on the screen of user device 102 via software generated light segments. The light segments may be generated on user devices that are not equipped with light sources. The light segments may be generated on user devices that are equipped with light sources, and may be used in combination with physical light sources (such as light sources 306, 406, 506, 606a, and/or 606b). Illumination module 206 may vary the intensity and color of the light segments based on the same factors described above in relation to the light sources. In various embodiments, illumination module 206 may generate light segments in lieu of activating the one or more light sources based on the battery level of the user device. For example, in various embodiments, illumination module 206 may be configured to switch from using light sources to using light segments to provide illumination if the battery level of the user device drops below 50%. In various embodiments, illumination module 206 may initially generate light segments (instead of activating light sources) if the difference between the detected ambient light and the threshold value is below a certain limit. For example, in various embodiments, illumination module 206 may generate light segments alone if the difference between the measured ambient light and the threshold value is less than 20 lux, but use a combination of generated light segments and activated light sources if the difference between the measured ambient light level and the threshold value is greater than 20 lux.

Figure 7A:
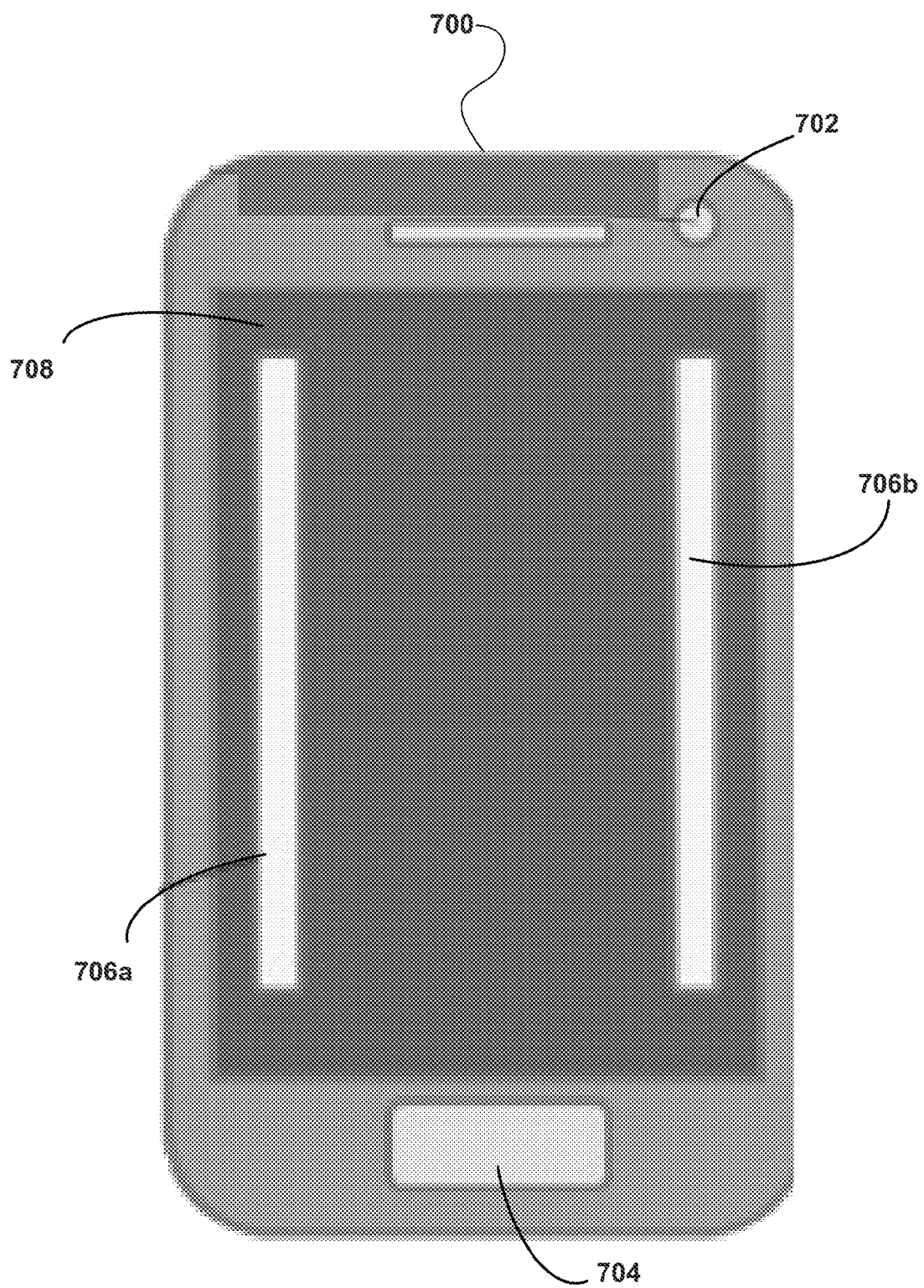
FIG. 7A is a mobile device with a screen-based illumination source according to a particular embodiment.

FIG. 7A shows a user device 700 having a front-facing camera 702, a home button 704, and a screen 708. As shown on screen 708, illumination module 206 may generate light segments 706a and 706b. The light segments may be white. The light segments may be a warm color, such as red, orange, or yellow. In FIG. 7A, light segments 706a and 706b are arranged vertically on screen 708. As shown in FIGS. 7A-7E, the center of screen 708 is left open for video calling. In various embodiments, illumination module 206 may generate light segments 706a and 706b in response to light detection module 204 determining that the difference between the measured ambient light level and the threshold level is less than a predetermined value (e.g., 20 lux). In this case, illumination module will only generate light segments 706a and 706b to provide illumination for the face of the user of user device 700.

Figure 7B:
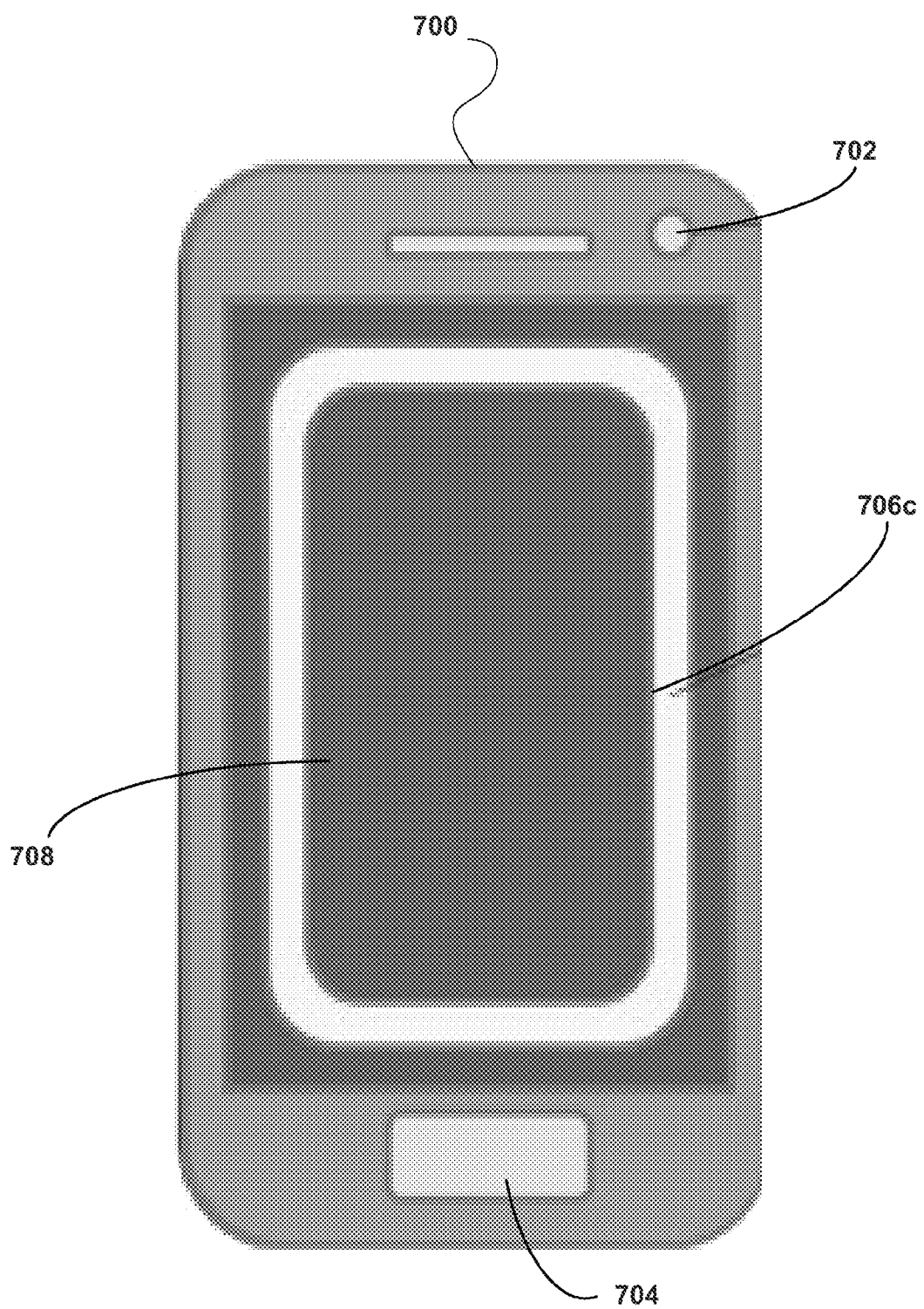
FIG. 7B is a mobile device with a screen-based illumination source according to a particular embodiment.

FIG. 7B shows an embodiment of user device 700 having a single light segment 706c. Segment 706c is shown as a rectangular shape that frames the outer edge of the screen 708. In various embodiments, illumination module 206 may generate light segment 706c in place of segments 706a and 706b if the difference between the measured ambient light level and the threshold level is within a certain range or greater than some minimum value. For example, in various embodiments, illumination module 206 may generate light segment 706c in place of light segments 706a and 706b if the difference between the ambient light level and the threshold level is between 20-40 lux. Illumination module 206 may increase the intensity of the light segment 706c as the difference between the measured ambient light level and the threshold level increases.

Figure 7C:
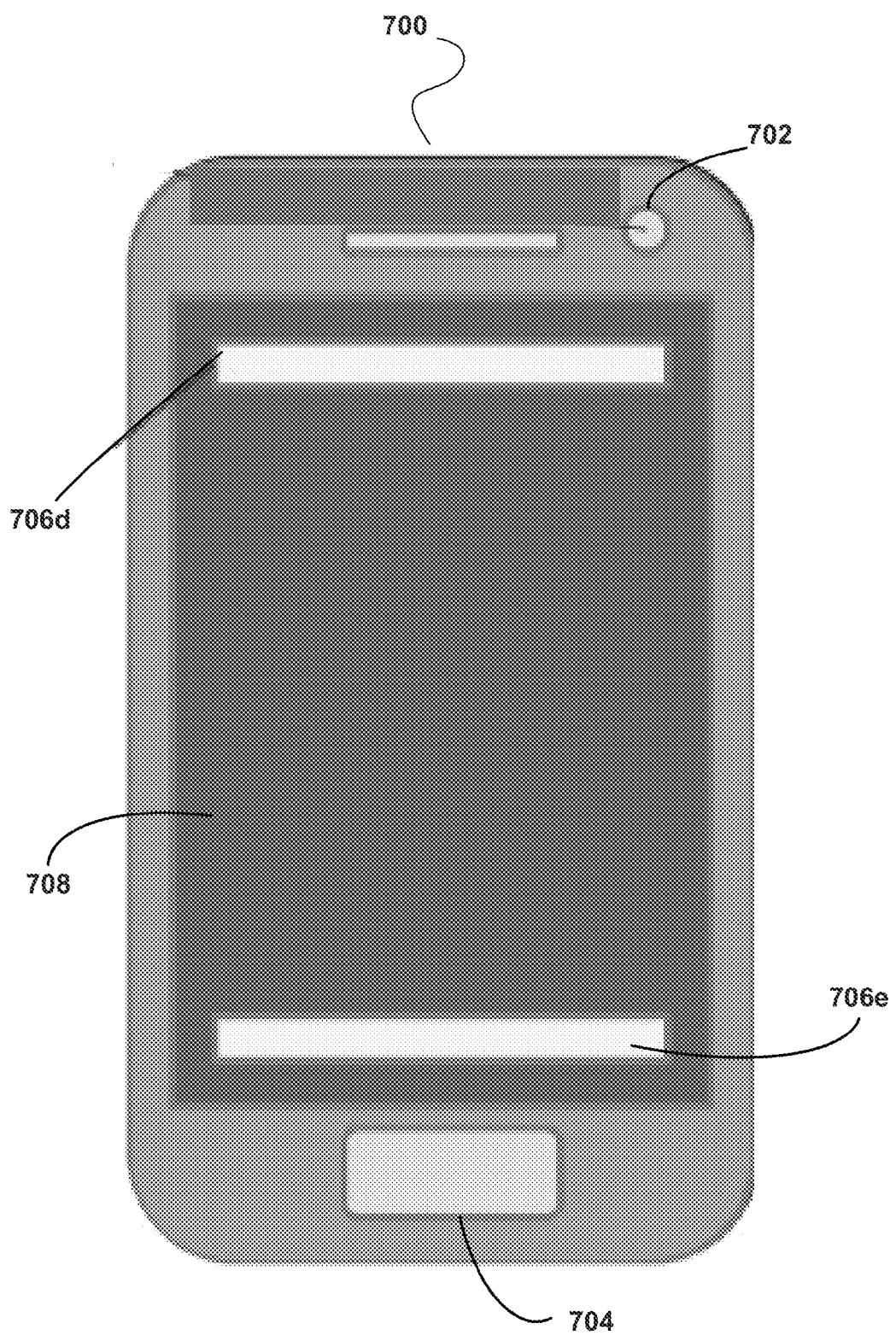
FIG. 7C is a mobile device with a screen-based illumination source according to a particular embodiment.

In various embodiments, interface module 210 may allow the user to select the configuration of the light segments on the screen. FIG. 7C shows and embodiment of user device 700 having light segments 706d and 706e. In FIG. 7C, light segments 706d and 706e are arranged horizontally at the top and bottom of screen 708, respectively. Illumination module 206 may generate light segments in addition to or instead of light segments 706a and 706b based on the measured ambient light level. Illumination module 206 may generate light segments based on the position of the calling parties face on the screen of user device 700. For example, if the calling party has a wider face and this is detected by video call module 202, illumination module 206 may generate light segments 706d and 706e. If the calling party has a "longer" or skinnier face and this is detected by video call module 202, illumination module 206 may generate light segments 706a and 706b. The size of light segments 706a, 706b, 706c, 706d, and 706e may depend on the shape and/or size of the face of the calling party, as well as the level of ambient light that is detected by user device 700.

Figure 7D:
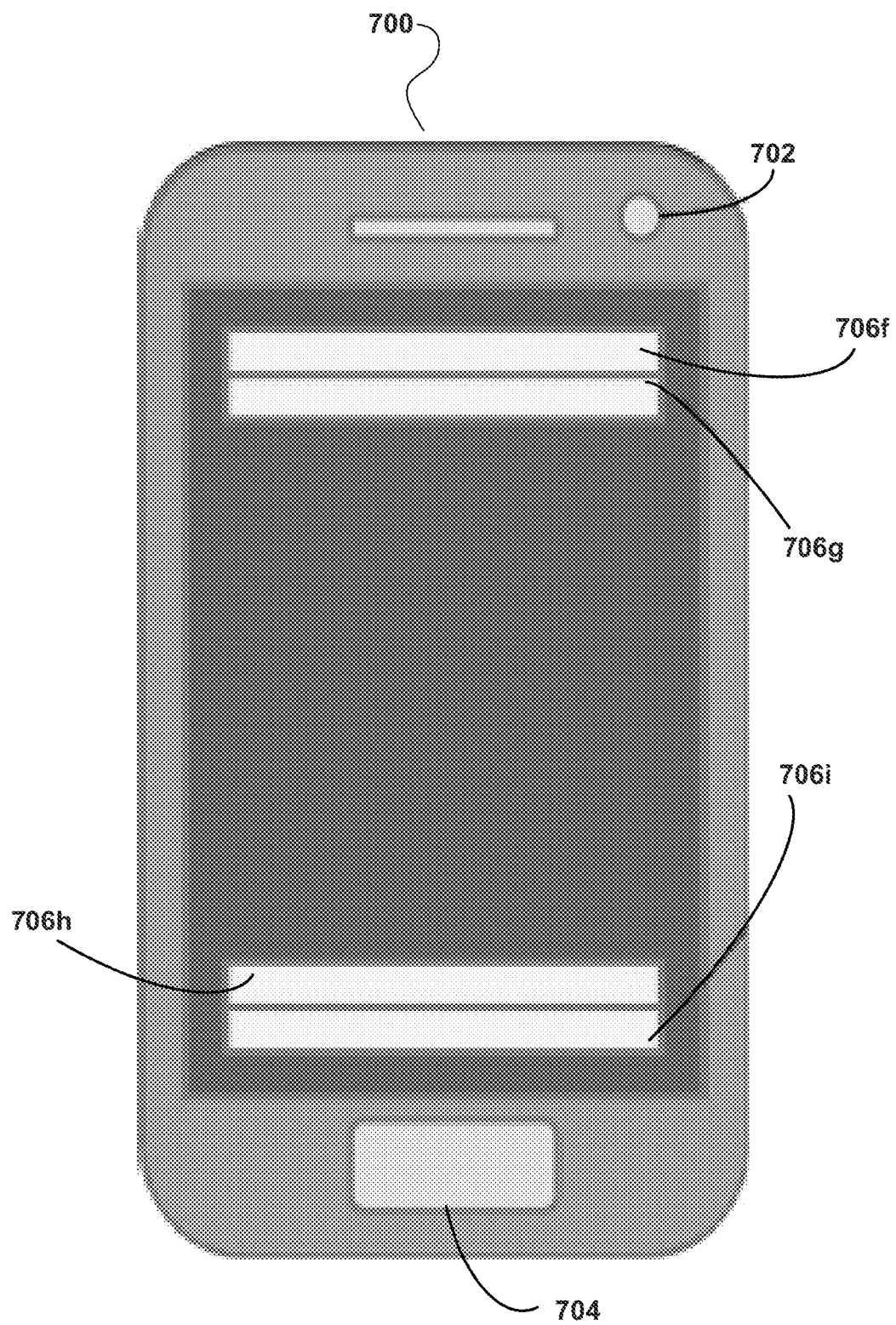
FIG. 7D is a mobile device with a screen-based illumination source according to a particular embodiment.
Figure 7E:
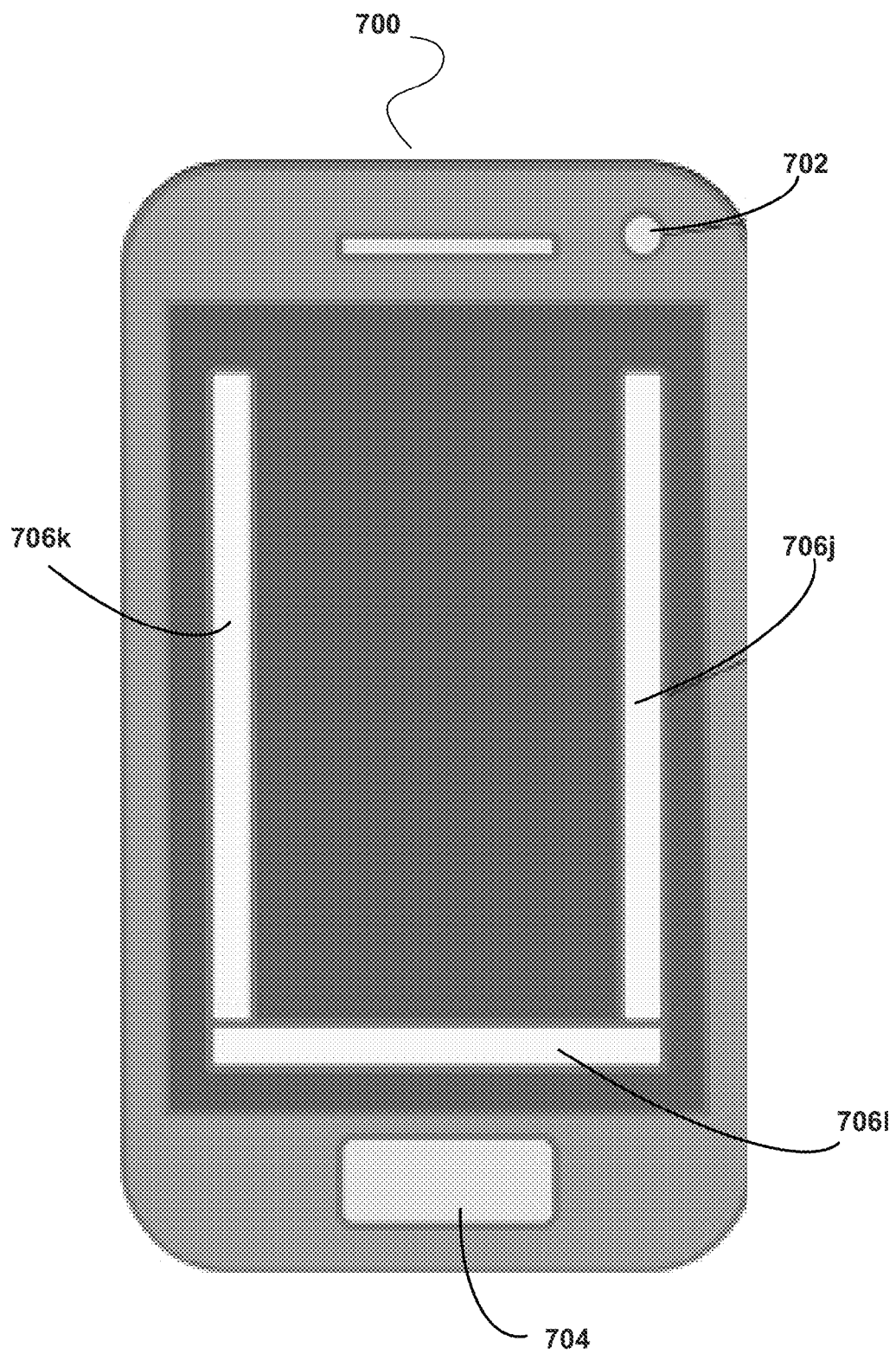
FIG. 7E is a mobile device with a screen-based illumination source according to a particular embodiment.

FIG. 7D shows an embodiment of user device 700 having light segments 706f-706i. The additional light segments 706f-706i may be generated by illumination module 206 in response to decreased ambient light levels (e.g., light segments 706f-706i may replace and/or be added to light segments 706d and 706e in response to decreased ambient light levels, and vice versa). FIG. 7E shows an embodiment of user device 700 having light segments 706k-706l. Interface module 210 may allow the user to customize the size, shape, location, color, and intensity/brightness of the light segments generated by illumination module 206.

Contact list module 208 may have access to the contact list stored on user device 102. The contact list may comprise the name, phone number, email address, physical address, and other identifying information associated with different individuals and entities. Contact list module 208 may allow the user to associate certain lighting settings with incoming video calls from certain individuals on the user's contact list. For example, interface module 210 and contact list module 208 may allow the user to set the lighting intensity, color, and/or lighting segment configuration for incoming video calls from a certain contact or outgoing video calls to a certain contact. When video call module 202 receives an indication of an incoming video call or outgoing video call, contacts list module 208 may compare the number with the numbers in the contact list. If there is a match, contact list module may activate the specific settings associated with that contact (if the user has previously configured certain settings for that contact). If there are no unique settings for that contact, interface system 104 may use default settings. Contact list module 208 may apply unique settings based on the priority level associated with the call.

Figure 8:
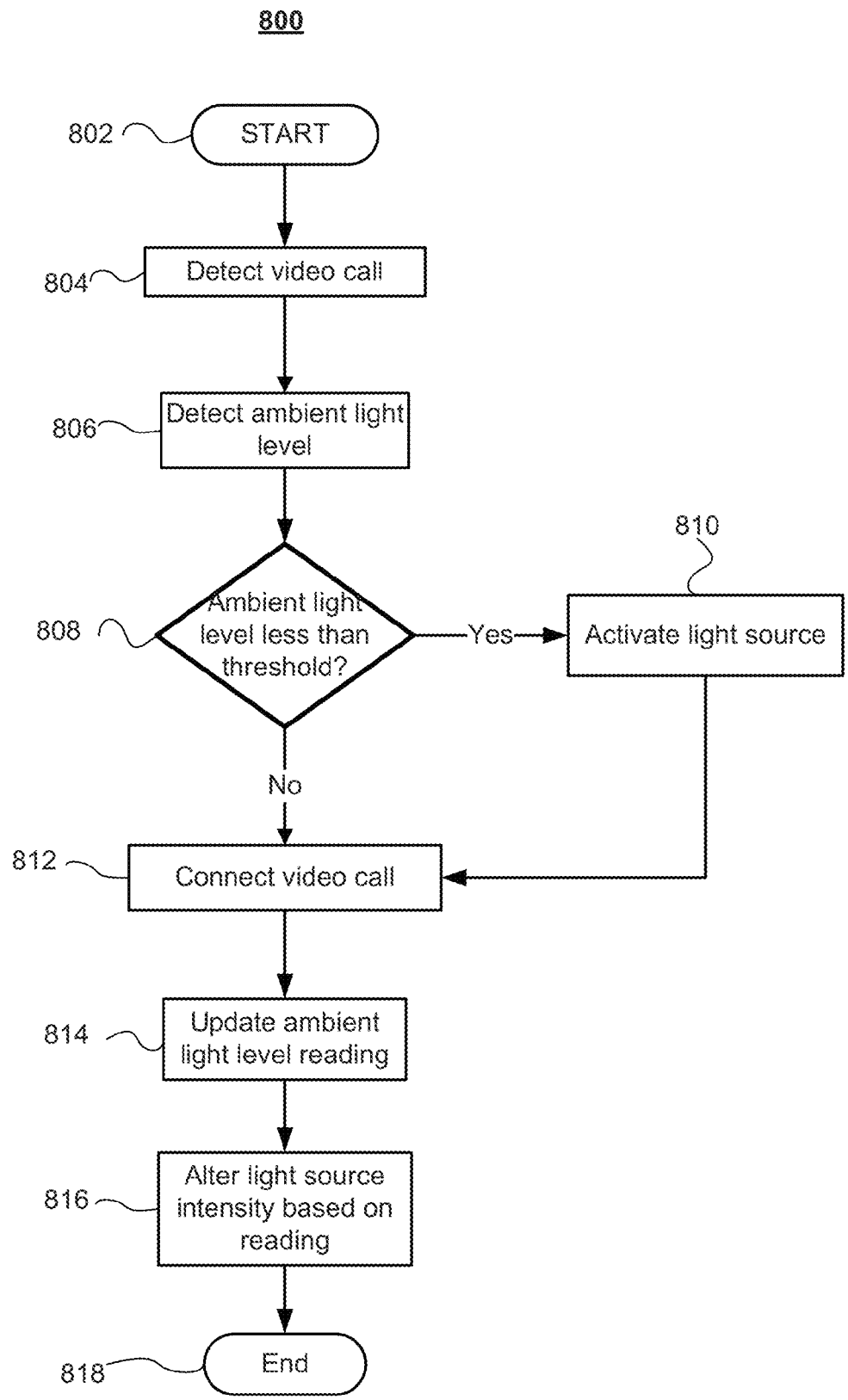
FIG. 8 is a block diagram illustrating a method according to a particular embodiment.

FIG. 8 is a flowchart illustrating the functionality of a method according to an embodiment of the disclosure. This method is provided by way of example, as there are a variety of ways to carry out the methods described herein. Method 800 shown in FIG. 8 may be executed or otherwise performed by one or a combination of various systems. The method 800 may be carried out through system 100 of FIG. 1 and/or the one or more modules shown in FIG. 2, by way of example, and various elements of FIG. 1 and FIG. 2 are referenced in explaining method 800 of FIG. 8. Each block shown in FIG. 8 represents one or more processes, methods, or subroutines carried out in method 800. Method 800 may begin at block 802.

At block 804, method 800 may detect a video call signal. The video call may be an incoming call from another device (e.g., user device 106) or an outgoing video call to another device (e.g., user device 106). The call may be sent or received over network 108. The call may be a VoLTE video call. The call may include the phone number associated with user device 106. The call may include other data that identifies user device 106. User device 102 may present an interface to the user, alerting the user of the video call. Method 800 may proceed to block 806.

At block 806, method 800 may detect the ambient light level. Light detection module 204 may interface with one or more sensors on user device 102, which are configured to detect ambient light levels when user device 102 receives or initiates a video call. The sensors may be analog and/or digital ambient light sensors (ALS). The sensors may be located with the front-facing camera on user device 102. The sensors may measure the ambient light level in response to user device 102 detecting a video call. In various embodiments, the ambient light may be measured in lux. Method 800 may proceed to block 808.

At block 808, method 800 may compare the measured ambient light level to a threshold level. The threshold level may have been predetermined by the user. The threshold level may have been programmed into illumination system 104. The threshold level may be the level of ambient light necessary to sufficiently illuminate the face of the user of user device 102 when he or she uses device 102 for a video call. If the measured ambient light level is less than the threshold level, method 800 may proceed to block 810. If the measured ambient light level is greater than or equal to the threshold level, method 800 may proceed to block 812.

In various embodiments, at block 808, instead of or in addition to the comparison step described above, illumination system 104 may use the front-facing camera on user device 102 to attempt to recognize the face of the user of user device 102 (assuming the user is facing the camera and attempting to answer the incoming video call). If illumination system 104 is able to recognize the face of the user (or recognize the outline of the user's face), method 800 may proceed to block 812. Otherwise, method 800 may proceed to block 810.

At block 810, method 800 may activate one or more light sources to illuminate the face of the user of user device 102. The light source may be a physical light source integrated into user device 102. The light source may be an LED light. The light source may be one or more software-generated elements on the screen of user device 102. The light source may be white light. The light source may be infrared light. The light source may be a mild light, such as red, orange, or yellow. The intensity of the light from the light source may depend on the level of ambient light detected in block 806 and/or the difference between the ambient light and the threshold level in block 808. Illumination system 104 may be configured to allow the user to set and/or modify the intensity of the light from the light source (or light sources) using one or more selectable cursors on the screen of user device 102. The intensity of the light from the light source may depend on the battery level of the user device. Method 800 may proceed to block 812.

At block 812, method 800 may connect the video call. The user of user device 102 may be able to view and communicate with the other party on the screen of user device 102. The face of the user of user device 102 may be illuminated by the light sources. Method 800 may proceed to block 814.

At block 814, method 800 may receive updated ambient light level readings. The ambient light level readings may be received at regular intervals while the video call is in progress. Method 800 may proceed to block 816.

At block 816, method 800 may alter the intensity of the light emitted by the light sources based on the updated ambient light readings. Method 800 may compare the updated reading to the threshold level (as in block 808). If the original reading was 50 lux, and the threshold level was 30 lux, then the illumination system 104 would not have initially activated the light source at the beginning of the video call. If the updated reading is now 25 lux, the illumination system 104 may activate the light source and set the intensity/brightness of the emitted light based on the difference between the updated reading and the minimum level. If at the next reading, the updated level is measured at 10 lux, illumination system 104 may increase the intensity/brightness of the light emitted by the light source accordingly. Method 800 may end at block 818.

At block 818, method 800 may end.

Figure 9:
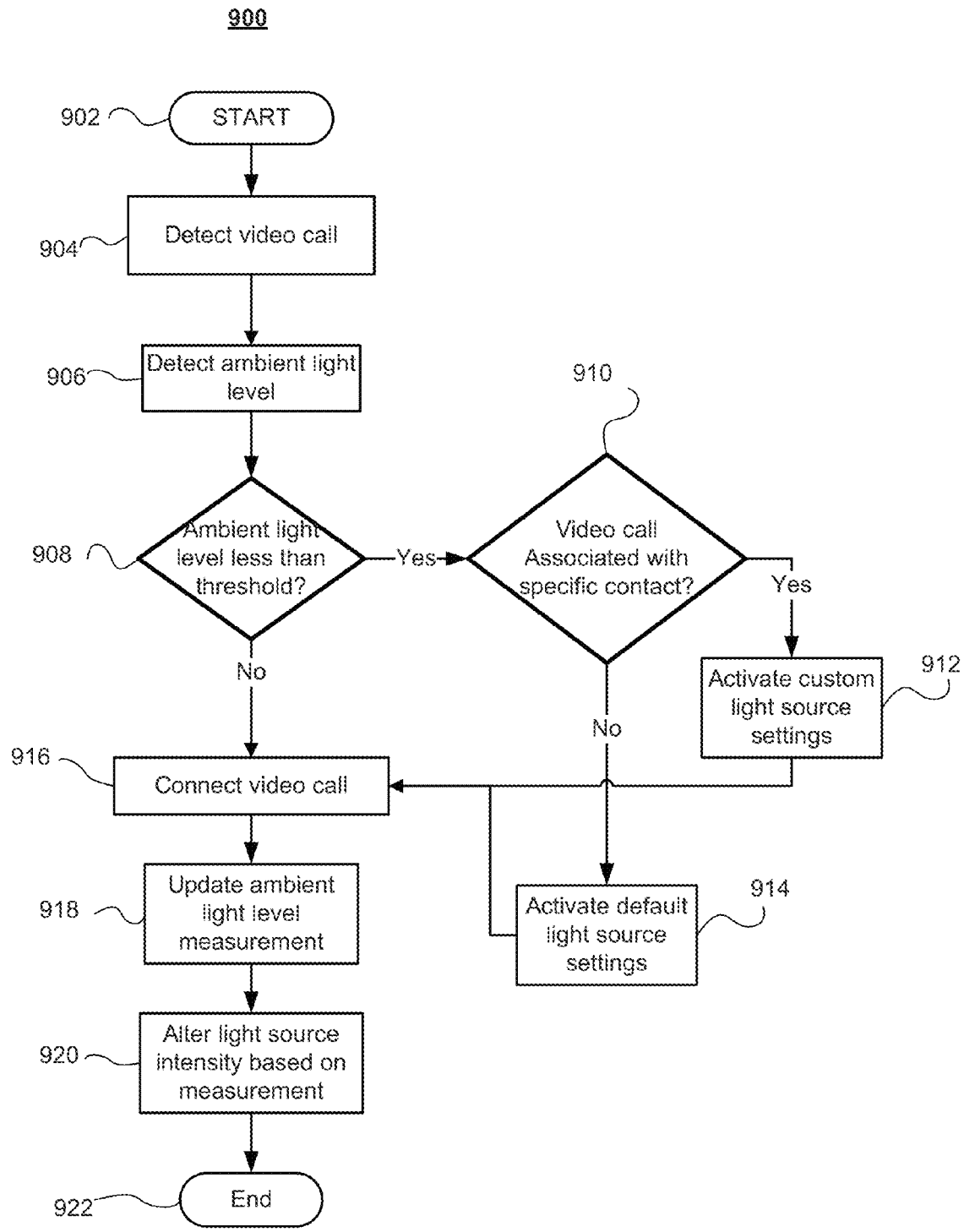
FIG. 9 is a block diagram illustrating a method according to a particular embodiment.

FIG. 9 is a flowchart illustrating the functionality of a method according to an embodiment of the disclosure. This method is provided by way of example, as there are a variety of ways to carry out the methods described herein. Method 900 shown in FIG. 9 may be executed or otherwise performed by one or a combination of various systems. The method 900 may be carried out through system 100 of FIG. 1 and/or the one or more modules shown in FIG. 2, by way of example, and various elements of FIG. 1 and FIG. 2 are referenced in explaining method 900 of FIG. 9. Each block shown in FIG. 9 represents one or more processes, methods, or subroutines carried out in method 900. Method 900 may begin at block 902.

Blocks 902-908 may be similar to blocks 802-808 of method 800. At block 908, if the detected ambient light level is less than the minimum level, method 900 may proceed to block 910. At block 910, method 900 may compare the number of the calling party with a contact list on user device 102. The contact list on user device 102 may comprise an address list of names, phone numbers, email addresses, and other unique information identifying other users. If the number of the other party matches a number in the contact list, method 900 may proceed to block 912. If the number of the other party does not match a number in the contact list, method 900 may proceed to block 914 (which may be identical to block 810 in method 800).

At block 912, method 900 may activate a custom light source setting associated with the number of the other party found in the contact list on user device 102. The custom setting may have previously been set up by the user of user device 102. The custom setting may dictate, for example, the intensity/brightness of the light from the light source, the color of the light from the light source, and the like. At block 916, method 900 may connect the video call (similar to block 812 in method 800). At block 918, method 900 may update the ambient light level measurement (similar to block 814 in method 800). At block 920, method 900 may alter the light source intensity/brightness based on the updated ambient light measurement. If the video call is associated with a specific contact (from block 910), the level of light source intensity/brightness may still be determined by the custom light source setting (from block 912). In various embodiments, the light source intensity/brightness may be changed by the user using an interactive cursor on user device 102. At block 922, method 900 may end.

The various computing devices above (including phones and network equipment), generally include computer-executable instructions, where the instructions may be executable by one or more processors. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

Databases, data repositories or other data stores described herein, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A user device, comprising:
   a memory; and
   a processor to:
      detect a video call signal,
      receive a first measured ambient light level from at least one sensor,
      compare the first measured ambient light level with a threshold value that is determined by a user of the user device,
      determine that the first measured ambient light level is less than the threshold value based on comparing the first measured ambient light level with the threshold value,
      determine, based on determining that the first measured ambient light level is less than the threshold value, that a contact number, specified by the video call signal, matches a number of a contact of one or more contacts in an address list stored on the user device,
      determine a custom configuration associated with the contact based on determining that the contact number, specified by the video call signal, matches the number of the contact,
      activate, based on the custom configuration associated with the contact, at least one light source to emit light at a first intensity level to illuminate a face of the user, and
      facilitate, after activating the at least one light source, a video call for the user based on the video call signal.

2. The user device of claim 1, wherein the first intensity level is a function of a difference between the first measured ambient light level and the threshold value.

3. The user device of claim 2, wherein the function is at least one of a linear function, a nonlinear function, or a step function.

4. The user device of claim 1,
   wherein the processor is further to:
      receive, after receiving the first measured ambient light level, a second measured ambient light level from the at least one sensor,
      compare the second measured ambient light level with the threshold value, and
      signal the at least one light source to adjust the first intensity level to emit the light at a second intensity level, and
   wherein the second intensity level is a function of a difference between the second measured ambient light level and the threshold value.

5. The user device of claim 1, wherein the processor is further to:
   generate an interface on a screen, of the user device, to enable the user to configure at least one of a color or an intensity level of the light emitted by the at least one light source.

6. The user device of claim 1, wherein the at least one light source comprises a light emitting diode (LED).

7. The user device of claim 1, wherein the at least one light source comprises a light-emitting element generated on a screen.

8. The user device of claim 1, wherein the video call signal is one of an outgoing signal indicating the user device is attempting to make the video call to another device or an incoming signal indicating the other device is attempting to make the video call to the user device.

9. The user device of claim 1, wherein the custom configuration controls at least one of a color or a direction of the light emitted from the at least one light source.

10. The user device of claim 1, wherein the custom configuration comprises an intensity of the light emitted from the at least one light source.

11. A method, comprising:
    detecting, by a user device, a video call signal;
    receiving, by the user device, a first measured ambient light level from at least one sensor associated with the user device;
    comparing, by the user device, the first measured ambient light level with a threshold value that is set by a user of the user device;
    determining, by the user device, that the first measured ambient light level is less than the threshold value based on comparing the first measured ambient light level with the threshold value;
    identifying, based on the video call signal and after determining that the first measured ambient light level is less than the threshold value, a contact in an address list associated with the user device;
    determining, by the user device, a custom configuration associated with the contact;
    activating, by the user device and based on the custom configuration associated with the contact, at least one light source to emit light at a first intensity level to illuminate a face of the user; and
    facilitating, by the user device, a video call for the user based on the video call signal.

12. The method of claim 11, wherein the first intensity level is a function of a difference between the first measured ambient light level and the threshold value.

13. The user device of claim 12, wherein the function is at least one of a linear function, a nonlinear function, or a step function.

14. The method of claim 11, further comprising:
    receiving, after receiving the first measured ambient light level, a second measured ambient light level from the at least one sensor,
    comparing the second measured ambient light level with the threshold value, and signaling the at least one light source to adjust the first intensity level to emit the light at a second intensity level, wherein the second intensity level is a function of a difference between the second measured ambient light level and the threshold value.

15. The method of claim 11, further comprising:
generating an interface on the user device to enable the user to configure at least one of a color or an intensity level of the light emitted by the at least one light source.

16. The method of claim 11, wherein the at least one light source comprises a light emitting diode (LED).

17. The method of claim 11, wherein the at least one light source comprises a light-emitting element generated on a screen of the user device.

18. The method of claim 11, wherein the video call signal is one of an outgoing signal indicating the user device is attempting to make the video call to another device or an incoming signal indicating the other device is attempting to make the video call to the user device.

19. The method of claim 11, wherein the custom configuration controls at least one of a color, an intensity, or a direction of the light emitted from the at least one light source.

20. The method of claim 11, wherein identifying the contact comprises:
determining, after determining that the first measured ambient light level is less than the threshold value, that a contact number, specified by the video call signal, matches a number of the contact, and
identifying the contact based on determining that the contact number matches the number of the contact.

\* \* \* \* \*